US011708240B2

(12) United States Patent
Singaraju et al.

(10) Patent No.: US 11,708,240 B2
(45) Date of Patent: Jul. 25, 2023

(54) AUTOMATIC METHOD OF DETECTING VISUALLY IMPAIRED, PREGNANT, OR DISABLED ELEVATOR PASSENGER(S)

(71) Applicant: OTIS ELEVATOR COMPANY, Farmington, CT (US)

(72) Inventors: Ravikiran Singaraju, Telangana (IN); Vinod Vejandla, Telangana (IN); Appalaraju Marpu, Telangana (IN); Madhavaraju Nadimpalli, Telangana (IN); Madhavi Mothukuri, Telangana (IN); Ashok Kumar Prakash, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1041 days.

(21) Appl. No.: 16/515,154

(22) Filed: Jul. 18, 2019

(65) Prior Publication Data

US 2020/0031618 A1 Jan. 30, 2020

(30) Foreign Application Priority Data

Jul. 25, 2018 (IN) ............................. 201811028019

(51) Int. Cl.
*B66B 5/00* (2006.01)
*B66B 1/24* (2006.01)
*G06V 40/16* (2022.01)

(52) U.S. Cl.
CPC .......... *B66B 5/0012* (2013.01); *B66B 1/2408* (2013.01); *G06V 40/172* (2022.01); *B66B 2201/20* (2013.01)

(58) Field of Classification Search
CPC . B66B 5/0012; B66B 1/2408; B66B 2201/20; B66B 1/468; B66B 2201/4669;
(Continued)

(56) References Cited

U.S. PATENT DOCUMENTS 6,152,265 A 11/2000 Bittar et al.
7,079,669 B2 7/2006 Hashimoto et al.
(Continued)

FOREIGN PATENT DOCUMENTS

CN 1656004 A 8/2005
CN 101061050 A 10/2007
(Continued)

OTHER PUBLICATIONS

Emmet Purcell; Future Tech: Mitsubishi's voice recognition lift for the disabled and visually-impaired; https://www.joe.ie/tech/future-tech-mitsubishis-voice-recognition-lift-for-the-disabled-and-visually-impaired-15490; 5 pages; Jun. 6, 2018.
(Continued)

*Primary Examiner* — Jeffrey Donels
(74) *Attorney, Agent, or Firm* — Cantor Colburn LLP

(57) ABSTRACT

A method for elevator passenger detection including: capturing an image of an elevator passenger approaching an elevator bank to board an elevator car; determining that the elevator passenger is pregnant or disabled in response to the image of the elevator passenger; registering a priority elevator call for the elevator passenger that is pregnant or disabled; and moving the elevator car to the floor landing where the elevator passenger that is pregnant or disabled is located.

17 Claims, 4 Drawing Sheets

(58) Field of Classification Search
CPC ........... B66B 1/02; B66B 1/3423; B66B 1/46; B66B 1/463; G06V 40/172; G06V 40/10
See application file for complete search history.

(56) References Cited

U.S. PATENT DOCUMENTS

| | | |
|---|---|---|
| 7,559,408 B2 | 7/2009 | Flynn et al. |
| 8,678,142 B2 | 3/2014 | Takeuchi |
| 9,045,314 B2 | 6/2015 | Finschi |
| 9,738,489 B2 | 8/2017 | Finschi |
| 2004/0022439 A1 | 2/2004 | Beardsley |
| 2012/0020518 A1 | 1/2012 | Taguchi |
| 2015/0266700 A1 | 9/2015 | Salmikuukka |
| 2021/0130124 A1* | 5/2021 | Liu ..................... B66B 1/2408 |

FOREIGN PATENT DOCUMENTS

| | | |
|---|---|---|
| CN | 101602453 A | 12/2009 |
| CN | 102364652 A | 2/2012 |
| CN | 102612480 A | 7/2012 |
| CN | 102730497 A | 10/2012 |
| CN | 103079979 A | 5/2013 |
| CN | 104291172 A | 1/2015 |
| CN | 104773624 A | 7/2015 |
| CN | 205222317 U | 5/2016 |
| CN | 205652931 U | 10/2016 |
| CN | 106976768 A | 7/2017 |
| CN | 206395630 U | 8/2017 |
| CN | 107187973 A | 9/2017 |
| CN | 207192551 U | 4/2018 |
| EP | 3290374 A1 | 3/2018 |
| GB | 1502921 | 3/1978 |
| JP | 5781132 B2 | 9/2015 |

OTHER PUBLICATIONS

First Office Action for Application No. 201910672671.5; Office Action dated Aug. 12, 2020; Office Action Received: Aug. 17, 2020; 8 pages.
Second Office Action for Application No. 201910672671.5; Office Action dated Mar. 29, 2021; Office Action Received: Apr. 26, 2021; 8 pages.
The Extended European Search Report for Application No. 19188474.1-1017/3611124; Report dated Mar. 19, 2020; Report Received: Oct. 28, 2020; 10 pages.
Third Office Action for Application No. 201910672671.5; Office Action dated Sep. 18, 2021; Office Action Received: Oct. 21, 2021; 9 pages.

* cited by examiner

AUTOMATIC METHOD OF DETECTING VISUALLY IMPAIRED, PREGNANT, OR DISABLED ELEVATOR PASSENGER(S)

CROSS-REFERENCE TO RELATED APPLICATIONS

This application claims the benefit of Provisional Indian Application No. 201811028019 filed Jul. 25, 2018, which is incorporated herein by reference in its entirety.

BACKGROUND

The embodiments herein relate to the field of elevator systems, and specifically to a method and apparatus for passenger detection in an elevator system.

Elevator system convey individuals to various locations within the building, however do not have the ability to distinguish between elevator passengers.

BRIEF SUMMARY

According to an embodiment, a method for elevator passenger detection is provided. The method including: capturing an image of an elevator passenger approaching an elevator bank to board an elevator car; determining that the elevator passenger is pregnant or disabled in response to the image of the elevator passenger; registering a priority elevator call for the elevator passenger that is pregnant or disabled; and moving the elevator car to the floor landing where the elevator passenger that is pregnant or disabled is located.

In addition to one or more of the features described herein, or as an alternative, further embodiments may include that the image includes at least one of a still image and a video image.

In addition to one or more of the features described herein, or as an alternative, further embodiments may include: analyzing a gait of the elevator passenger from the image, wherein the elevator passenger is determined to be pregnant or disabled in response to the gait of elevator passenger.

In addition to one or more of the features described herein, or as an alternative, further embodiments may include: determining an identity of the elevator passenger in response to the image.

In addition to one or more of the features described herein, or as an alternative, further embodiments may include that the image is a facial image of the elevator passenger and the identity of the elevator passenger is determined using facial recognition.

In addition to one or more of the features described herein, or as an alternative, further embodiments may include: confirming the elevator passenger is pregnant or disabled in response to the identity of the elevator passenger.

In addition to one or more of the features described herein, or as an alternative, further embodiments may include: cross-referencing the identity of the elevator passenger with at least one of a general passenger database, a passenger health database, and a publicly available information account to confirm that the elevator passenger pregnant or disabled.

In addition to one or more of the features described herein, or as an alternative, further embodiments may include: analyzing a shape of an abdomen of the elevator passenger, wherein the elevator passenger is determined to be pregnant in response to the shape of the abdomen of elevator passenger.

According to another embodiment, a method for elevator passenger detection is provided. The method including: detecting an elevator passenger touch on a destination call button panel within an elevator car; determining that the elevator passenger is visually impaired in response to the touch; enacting voice commands for the elevator passenger that is visually impaired to enter an elevator destination call via voice commands; moving the elevator car in response to the voice command from the elevator passenger that is visually impaired.

In addition to one or more of the features described herein, or as an alternative, further embodiments may include that the elevator passenger touch may be detected on braille located on the destination call button panel within the elevator car.

In addition to one or more of the features described herein, or as an alternative, further embodiments may include that the elevator passenger may be determined to be visually impaired in response to the touch when the touch has lasted greater than a selected period of time.

In addition to one or more of the features described herein, or as an alternative, further embodiments may include that the elevator passenger may be determined to be visually impaired in response to the touch when the touch has extended a selected distance across the destination call button panel.

In addition to one or more of the features described herein, or as an alternative, further embodiments may include that the elevator passenger may be determined to be visually impaired in response to the touch when the touch has included two or more separate touches.

In addition to one or more of the features described herein, or as an alternative, further embodiments may include that the elevator passenger may be determined to be visually impaired in response to the touch when the touch has included two or more separate touches to different elevator destination call buttons.

In addition to one or more of the features described herein, or as an alternative, further embodiments may include that enacting voice commands for the elevator passenger that is visually impaired to enter an elevator destination call via voice commands further comprises: audibly providing verbal instructions to the elevator passenger that is visually impaired to enter an elevator destination call via voice commands; and actively listening for a voice command from the elevator passenger that is visually impaired.

In addition to one or more of the features described herein, or as an alternative, further embodiments may include: allowing the elevator doors to close; and waiting a selected period of time for an elevator destination call entry via an elevator destination call button after the elevator doors have closed, wherein the elevator passenger is determined to be visually impaired in response to the touch and if no elevator destination call has been received from an elevator destination call button after the selected period of time.

According to another embodiment, an elevator passenger detection system is provided. The elevator passenger detection system including: a processor; and a memory comprising computer-executable instructions that, when executed by the processor, cause the processor to perform operations, the operations including: capturing an image of an elevator passenger approaching an elevator bank to board an elevator car; determining that the elevator passenger is pregnant or disabled in response to the image of the elevator passenger; registering a priority elevator call for the elevator passenger that is pregnant or disabled; and moving the elevator car to the floor landing where the elevator passenger that is pregnant or disabled is located.

In addition to one or more of the features described herein, or as an alternative, further embodiments may include that the image includes at least one of a still image and a video image.

In addition to one or more of the features described herein, or as an alternative, further embodiments may include that the operations further include: analyzing a gait of the elevator passenger from the image, wherein the elevator passenger is determined to be pregnant or disabled in response to the gait of elevator passenger.

In addition to one or more of the features described herein, or as an alternative, further embodiments may include that the operations further include: determining an identity of the elevator passenger in response to the image.

Technical effects of embodiments of the present disclosure include detecting and elevator passenger and providing accommodations for the elevator passenger accordingly.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
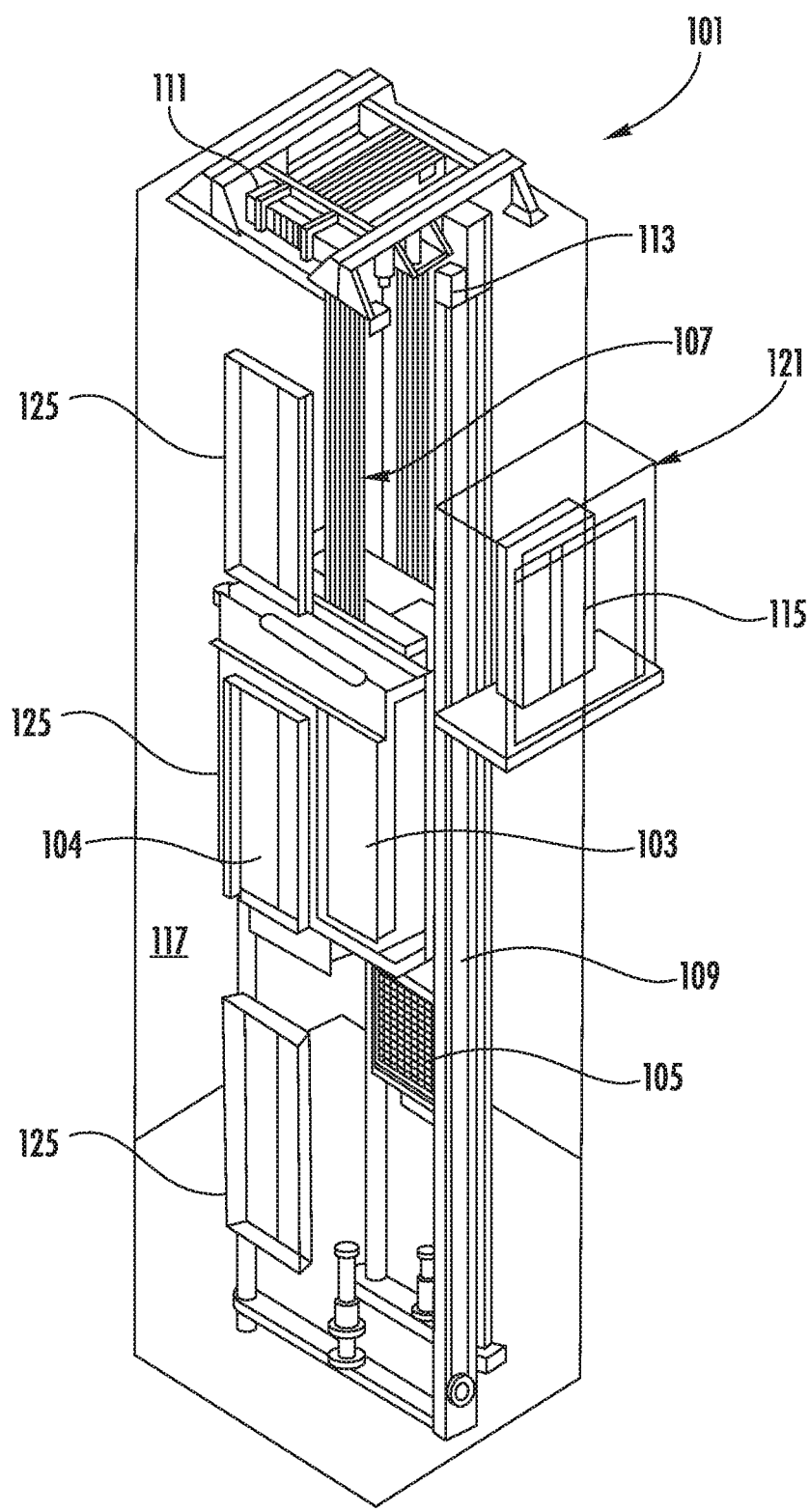
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, a door 104, and a system controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The system controller 115 is located, as shown, in a controller room 121 of the elevator shaft 117 and is configured to control the operation of the elevator system 101, and particularly the elevator car 103. For example, the system controller 115 may provide drive signals to the machine 111 to control the acceleration, deceleration, leveling, stopping, etc. of the elevator car 103. The system controller 115 may also be configured to receive position signals from the position reference system 113 or any other desired position reference device. When moving up or down within the elevator shaft 117 along guide rail 109, the elevator car 103 may stop at one or more landings 125 as controlled by the system controller 115. Although shown in a controller room 121, those of skill in the art will appreciate that the controller 115 can be located and/or configured in other locations or positions within the elevator system 101. In one embodiment, the system controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators systems, moving walkways, metro systems (e.g., subway systems), train systems, conveyer systems, production lines, people movers, etc. Accordingly, embodiments described herein are not limited to elevator systems, such as that shown in FIG. 1. In one example, embodiments disclosed herein may be applicable conveyance systems such as an elevator system 101 and a conveyance system component such as an elevator car 103 of the elevator system 101. In another example, embodiments disclosed herein may be applicable conveyance systems such as an escalator system and a conveyance system component such as a moving stair of the escalator system.

Figure 2:
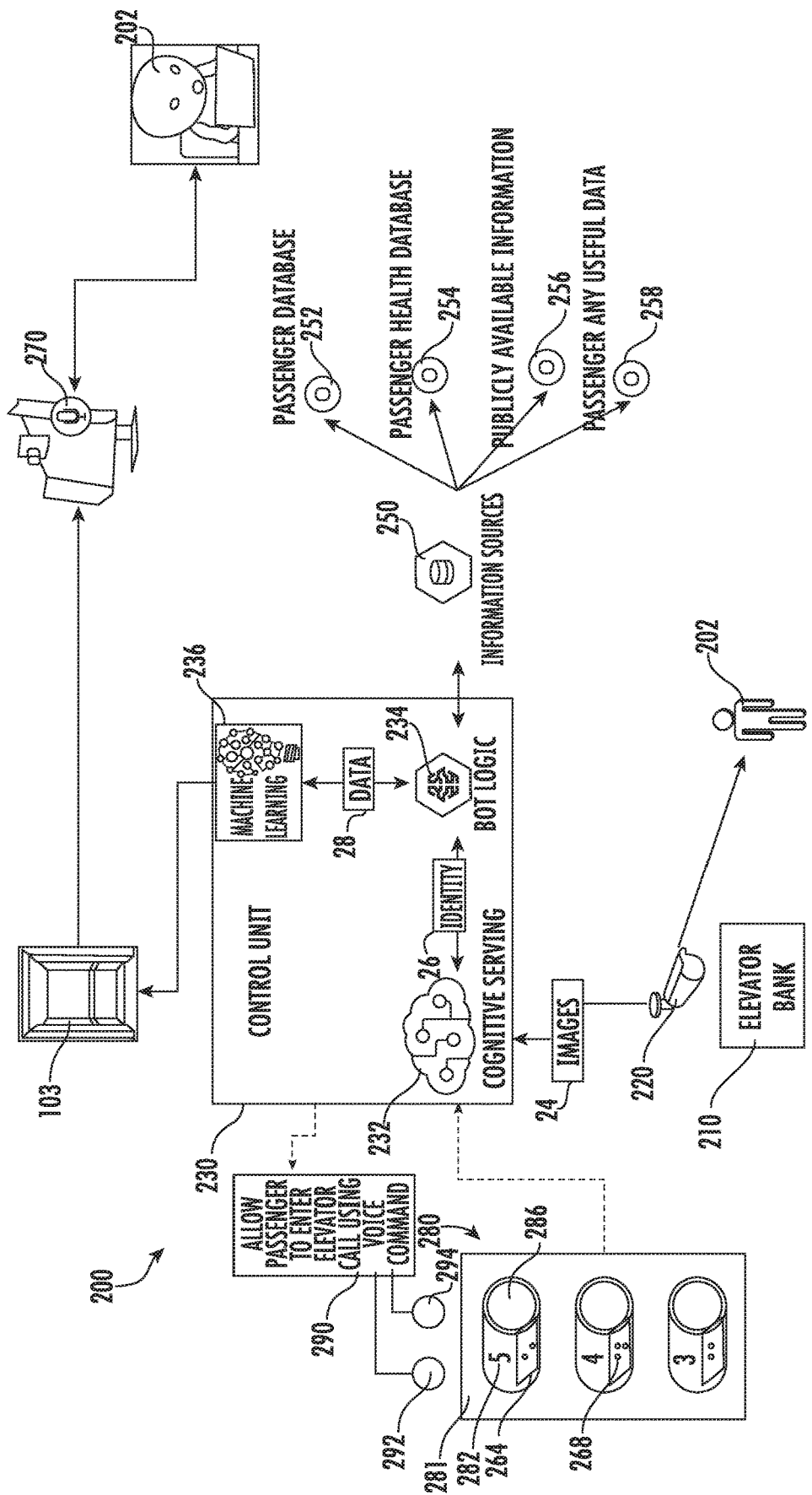
FIG. 2 is a schematic illustration of an elevator passenger detection system for use with one or more of the elevator system of FIG. 1, in accordance with an embodiment of the disclosure.

FIG. 2 is a view of an elevator passenger detection system 200 the may serve one or more elevator cars 103. The elevator passenger detection system 200 includes a control unit 230. The control unit 230 is configured to perform the analysis of the elevator passenger detection system 200. It should be appreciated that, although particular systems are separately defined in the schematic block diagrams, each or any of the systems may be otherwise combined or separated via hardware and/or software. For example, the control unit 230 may be a single device or multiple devices in communication with each other. The control unit may include a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

The elevator passenger detection system 200 also may utilize a camera 220 to determine whether an elevator passenger 202 is pregnant or disabled. Although only one camera 220 is illustrated, one or more cameras 220 may be utilized. The camera 220 is configured to capture images 24 of each elevator passenger 202 and may be a still image camera, video camera, digital camera, or any other camera known to one of skill in the art. The camera 220 may be located in a hallway proximate an elevator bank 210 to capture images of an elevator passenger 202 approaching the elevator bank 210. The images 24 are then transmitted to the control unit 230 for analysis.

The control unit 230 may comprise cognitive services 232, bot logic 234, and machine learning 236. The image 24 may be transmitted to the cognitive services 232 to perform object, face, and persons detection on the image. The cognitive services 232 may analyze the shape of an abdomen of the elevator passenger 202 to determine whether the elevator passenger 202 is pregnant or not. The cognitive services 232 may analyze the gait of an elevator passenger 202 to determine if they are walking with a limp, walking with another impairment, walking with a cane, visually impaired, walking with a visually impaired cane, walking with a walker, in wheel chair, or are simply having trouble walking. Additionally, the cognitive services 232 may perform facial recognition on the elevator passenger 202 to determine an identity 26 of the elevator passenger 202. Advantageously, cognitive service 232 along with deep learning will be capable of detecting a state of an object or an elevator passenger 202.

The identity 26 of the elevator passenger 202 may be transmitted to the bot logic 234 to further confirm whether the elevator passenger 202 is pregnant or disabled. The bot logic 234 is configured to cross-reference the identity 26 of the elevator passenger 202 with various information sources 250 to confirm that the elevator passenger 202 is pregnant or disabled. The bot logic 234 may cross-reference the identity 26 of the elevator passenger 202 with a general passenger database 252 to confirm that the elevator passenger 202 is pregnant or disabled. For example, an employer may have documented in internal databases that the elevator passenger 202 is pregnant or disabled. The bot logic 234 may cross-reference the identity 26 of the elevator passenger 202 with a passenger health database 254 to confirm that the elevator passenger 202 is pregnant or disabled. For example, an employer may have documented in health databases that the elevator passenger 202 is pregnant or disabled. The bot logic 234 may cross-reference the identity 26 of the elevator passenger 202 with available publicly available information 256 to confirm that the elevator passenger 202 is pregnant or disabled. The bot logic 234 may cross-reference the identity 26 of the elevator passenger 202 with any other useful data 258 to confirm that the elevator passenger 202 is pregnant or disabled. Bot logic 234 may be a machine learning service that integrates the output of the cognitive service 232 with the information sources 250 to more accurately identify the elevator passenger 202 or object to prioritize the elevator call. Based on the collection of information from the information sources 250 the bot logic 234 will make a decision and sends commands to the elevator system.

The machine learning 236 is configured to analyze the data 28 determined from the cognitive services 232 and the bot logic 234 using machine learning to take action. If the machine learning 236 has determined that the elevator passenger 202 is pregnant or disabled in response to the data 28, then the machine learning may register a priority elevator call for the passenger 202 that is pregnant or disabled. The machine learning 236 has the capability to learn new things and also has the capability of performing actions according to data 28 provided from the cognitive service 232 and bot logic 234.

Advantageously, the elevator system 101 may be configured to not allow anyone else in the elevator if a pregnant woman or disabled person is detected as the elevator passenger 202 in the elevator car 103.

The elevator passenger detection system 200 may also include a display device 270 in an elevator lobby proximate the elevator system 101 and/or in the elevator car 103. The display device 270 may be configured to perform video recognition of the elevator passenger 202 and/or voice recognition of the elevator passenger 202. The display device 270 may only be enabled for elevator passengers 202 that are pregnant or disabled. The display device 270 may be configured to inform the elevator passenger 202, which elevator car 103 can provide assistance to them through services such as, for example, a priority call. The elevator system 101 may also transmit information to the display device 270 to be displayed on the display device so that elevator passengers may view the information. The display device 270 may include screen privacy protectors (e.g., side-screen blockers, screen filter covers to obscure visibility at selected distances and angles. etc.) to ensure security.

In addition to the camera 220 or in replacement of the camera 220, the elevator passenger detection system 200 also may utilize a touch detector system 280 to determine whether an elevator passenger 202 is visually impaired (e.g., fully and/or partially visually impaired). The touch detector system 280 may include a touch sensor 284 located on the destination call button panel 281 within the elevator car 103. The destination call button panel 281 comprising a plurality of elevator destination call buttons 286 for elevator passengers 202 to enter their destination elevator call. The touch sensor 284 may be located proximate each number 282 indicating an elevator landing or floor and/or proximate an elevator destination call button 286 for the elevator landing or floor. The touch sensors 284 may include braille 288 for a visually impaired passenger to determine the elevator landing 125 for each destination call button 283. The touch sensors 284 may include the elevator destination call buttons 286. When the touch sensors 284 detects fingers of the elevator passengers sliding across the touch sensors 284 (e.g., across the braille 288 on the touch sensor 284), then it the control unit 230 may determine that a passenger 202 that is visually impaired is attempting to find an elevator destination call button 286. For example, once the elevator passenger 202 touches two or more touch sensors 284 then it may be determined that the elevator passenger 202 is visually impaired. Once the elevator passenger 202 is determined to be visually impaired then the control unit 230 may enact voice commands 290 audibly indicating to the elevator passenger 202 that a destination floor may be entered via voice commands 290 via a speaker 292. The control unit 230 may then listen for a voice command from the elevator passenger 202. When the voice command is received, the control unit 230 will register a destination elevator call for the elevator passenger 202. The control unit 230 may also require that the door(s) 104 of the elevator car 103 be closed for a selected time period (e.g., five seconds) with not destination entered prior to enacting voice commands 290.

Figure 3:
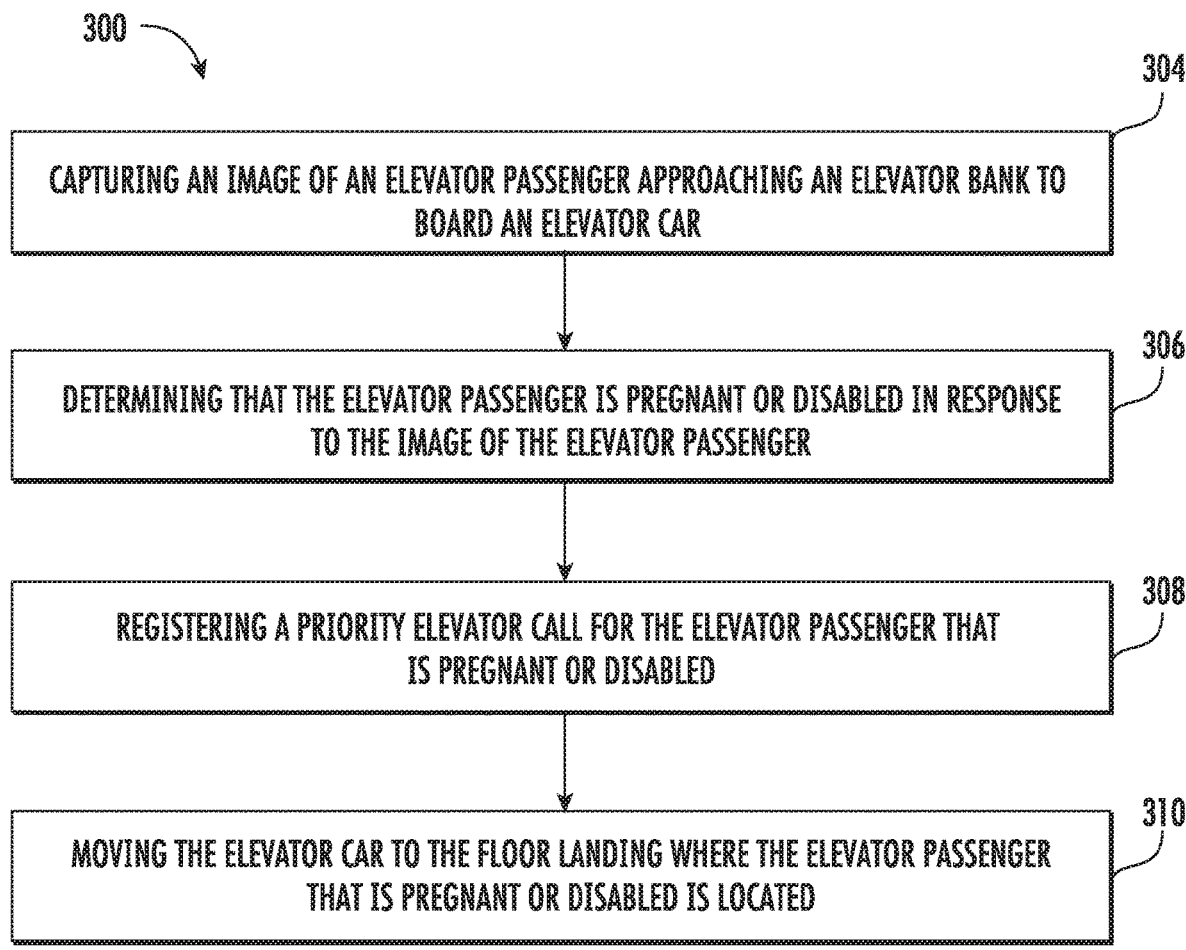
FIG. 3 is a flow chart of a method for elevator passenger detection, in accordance with an embodiment of the disclosure.

Referring now to FIG. 3, while referencing components of FIGS. 1-2. FIG. 3 shows a flow chart of a method 300 for elevator passenger 202 detection, in accordance with an embodiment of the disclosure. At block 304, an image 24 of an elevator passenger 202 approaching an elevator bank to board an elevator car 103 is captured. The image 24 may include at least one of a still image 24 and a video image 24. The image 24 may be of a facial image 24 of the elevator passenger 202. At block 306, it may be determined that the elevator passenger 202 is pregnant or disabled in response to the image 24 of the elevator passenger 202. The method 300 may further include analyzing a gait of the elevator passenger 202 from the image 24. The method 300 may further include analyzing a shape of the abdomen of the elevator passenger 202 from the image 24. The elevator passenger 202 may be determined to be pregnant or disabled in response to the gait of elevator passenger 202. At block 308, a priority elevator call is registered for the elevator passenger 202 that is pregnant or disabled. At block 310, the elevator car 103 is moved to the floor landing 125 where the elevator passenger 202 that is pregnant or disabled is located.

The method 300 may also comprise: determining an identity 26 of the elevator passenger 202 in response to the image 24. The identity 26 of the elevator passenger 202 may be determined using facial recognition. The method 300 may further comprise: confirming the elevator passenger 202 is pregnant or disabled in response to the identity 26 of the elevator passenger 202. The elevator passenger 202 may be confirmed to be pregnant or disabled by: cross-referencing the identity 26 of the elevator passenger 202 with at least one of a general passenger database 252, a passenger health database 254, and publicly available information 256 to confirm that the elevator passenger 202 pregnant or disabled.

While the above description has described the flow process of FIG. 3 in a particular order, it should be appreciated that unless otherwise specifically required in the attached claims that the ordering of the steps may be varied.

Figure 4:
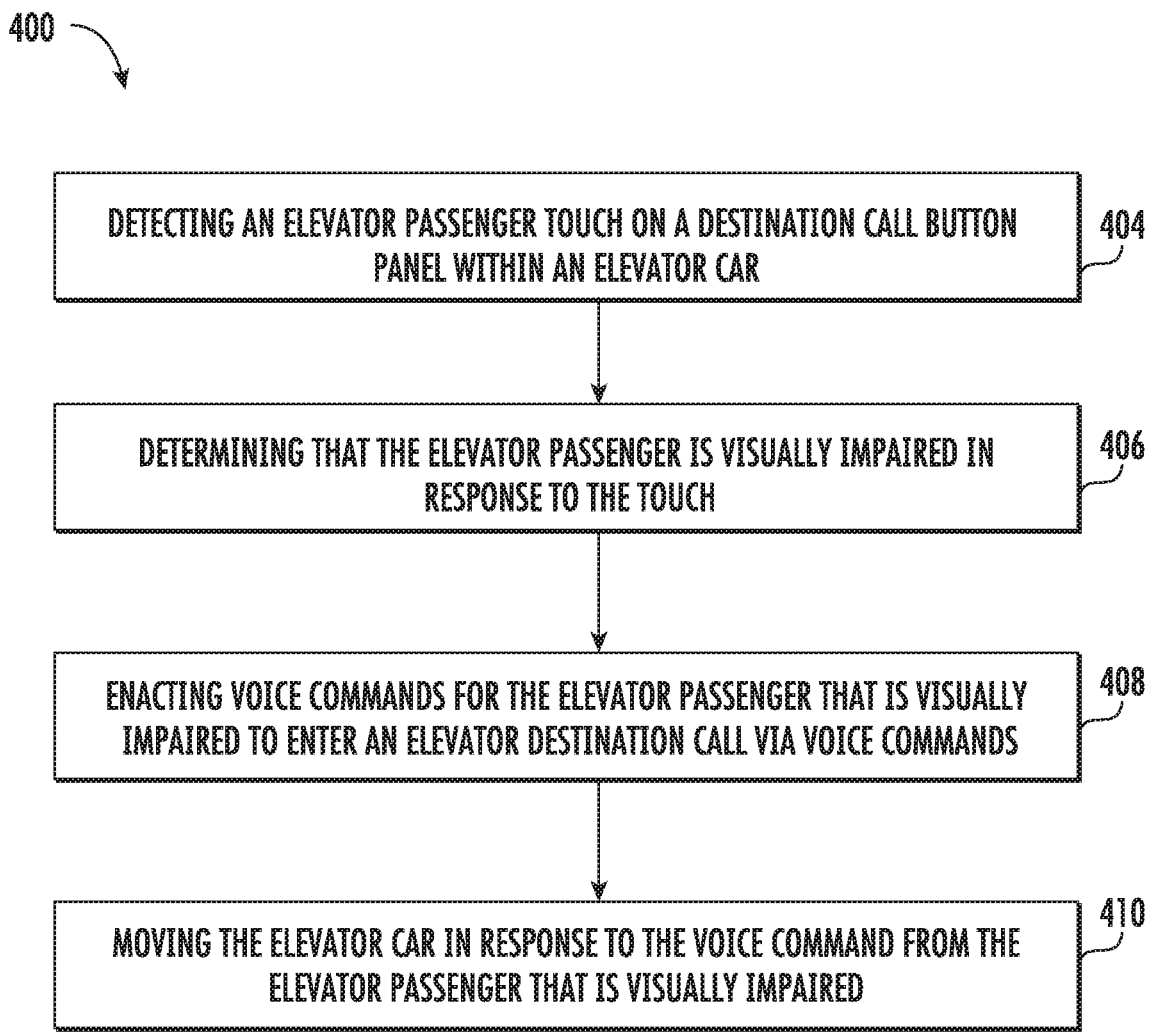
FIG. 4 is a flow chart of a method for elevator passenger detection, in accordance with an embodiment of the disclosure.

Referring now to FIG. 4, while referencing components of FIGS. 1-2. FIG. 4 shows a flow chart of a method 400 for elevator passenger 202 detection, in accordance with an embodiment of the disclosure. At block 404, an elevator passenger 202 touch on a destination call button panel 281 within an elevator car 103 is detected. The elevator passenger 202 touch may be detected on braille 288 located on the destination call button panel 281 within the elevator car 103. At block 406, it is determined that the elevator passenger 202 is visually impaired in response to the touch. In an embodiment, the elevator passenger 202 may be determined to be visually impaired in response to the touch when the touch has lasted greater than a selected period of time. In another embodiment, the elevator passenger 202 may be determined to be visually impaired in response to the touch when the touch has extended a selected distance across the destination call button panel 281. In another embodiment, the elevator passenger 202 may be determined to be visually impaired in response to the touch when the touch has included two or more separate touches. In another embodiment, the elevator passenger 202 may be determined to be visually impaired in response to the touch when the touch has included two or more separate touches to different elevator destination call buttons 286.

The elevator passenger 202 may be determined to be visually impaired in response to the touch and/or if no elevator destination call has been received from an elevator destination call button 286 after the selected period of time, thus the method 400 may further comprise: allowing the elevator doors 104 to close; and waiting a selected period of time for an elevator destination call entry via an elevator destination call button 286 after the elevator doors 104 have closed. The selected period of time may be about 5 seconds.

At block 408, voice commands 290 are enacted for the elevator passenger 202 that is visually impaired to enter an elevator destination call via voice commands. When voice commands are enacted 230 the control unit 230 may audibly provide verbal instructions to the elevator passenger 202 that is visually impaired to enter an elevator destination call via voice commands; and actively listen for a voice command from the elevator passenger 202 that is visually impaired. The voice command may include a destination floor. At block 410, the elevator car 103 is moved in response to the voice command from the elevator passenger 202 that is visually impaired. The elevator car 103 may be moved to the destination floor.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as a processor 214 in mobile wireless access point 210. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for elevator passenger detection, the method comprising:
    capturing an image of an elevator passenger approaching an elevator bank to board an elevator car;
    determining that the elevator passenger is pregnant or disabled in response to the image of the elevator passenger;
    registering a priority elevator call for the elevator passenger that is pregnant or disabled; and
    moving the elevator car to the floor landing where the elevator passenger that is pregnant or disabled is located;
    wherein the method further comprises:
    determining an identity of the elevator passenger in response to the image;
    confirming the elevator passenger is pregnant or disabled in response to the identity of the elevator passenger.

2. The method of claim 1, wherein the image includes at least one of a still image and a video image.

3. The method of claim 1, further comprising:
    analyzing a gait of the elevator passenger from the image, wherein the elevator passenger is determined to be pregnant or disabled in response to the gait of elevator passenger.

4. The method of claim 1, wherein the image is a facial image of the elevator passenger and the identity of the elevator passenger is determined using facial recognition.

5. The method of claim 1, further comprising:
    cross-referencing the identity of the elevator passenger with at least one of a general passenger database, a passenger health database, and a publicly available information account to confirm that the elevator passenger pregnant or disabled.

6. The method of claim 1, further comprising:
    analyzing a shape of an abdomen of the elevator passenger, wherein the elevator passenger is determined to be pregnant in response to the shape of the abdomen of elevator passenger.

7. A method for elevator passenger detection, the method comprising:
    detecting an elevator passenger touch on a destination call button panel within an elevator car;
    determining that the elevator passenger is visually impaired in response to the touch;
    enacting voice commands for the elevator passenger that is visually impaired to enter an elevator destination call via voice commands; and
    moving the elevator car in response to the voice command from the elevator passenger that is visually impaired.

8. The method of claim 7, wherein the elevator passenger touch may be detected on braille located on the destination call button panel within the elevator car.

9. The method of claim 7, wherein the elevator passenger may be determined to be visually impaired in response to the touch when the touch has lasted greater than a selected period of time.

10. The method of claim 7, wherein the elevator passenger may be determined to be visually impaired in response to the touch when the touch has extended a selected distance across the destination call button panel.

11. The method of claim 7, wherein the elevator passenger may be determined to be visually impaired in response to the touch when the touch has included two or more separate touches.

12. The method of claim 7, wherein the elevator passenger may be determined to be visually impaired in response to the touch when the touch has included two or more separate touches to different elevator destination call buttons.

13. The method of claim 7, wherein enacting voice commands for the elevator passenger that is visually impaired to enter an elevator destination call via voice commands further comprises:
    audibly providing verbal instructions to the elevator passenger that is visually impaired to enter an elevator destination call via voice commands; and
    actively listening for a voice command from the elevator passenger that is visually impaired.

14. The method of claim 7, further comprising:
    allowing the elevator doors to close; and
    waiting a selected period of time for an elevator destination call entry via an elevator destination call button after the elevator doors have closed, wherein the elevator passenger is determined to be visually impaired in response to the touch and if no elevator destination call has been received from an elevator destination call button after the selected period of time.

15. An elevator passenger detection system, the elevator passenger detection system comprising:
    a processor; and
    a memory comprising computer-executable instructions that, when executed by the processor, cause the processor to perform operations, the operations comprising:
    capturing an image of an elevator passenger approaching an elevator bank to board an elevator car;
    determining that the elevator passenger is pregnant or disabled in response to the image of the elevator passenger;
    registering a priority elevator call for the elevator passenger that is pregnant or disabled; and moving the elevator car to the floor landing where the elevator passenger that is pregnant or disabled is located;

wherein the operations further comprise:

determining an identity of the elevator passenger in response to the image;

confirming the elevator passenger is pregnant or disabled in response to the identity of the elevator passenger.

16. The elevator passenger detection system of claim 15, wherein the image includes at least one of a still image and a video image.

17. The elevator passenger detection system of claim 15, wherein the operations further comprise:

analyzing a gait of the elevator passenger from the image, wherein the elevator passenger is determined to be pregnant or disabled in response to the gait of elevator passenger.

\* \* \* \* \*